United States Patent
Engel et al.

(10) Patent No.: US 9,583,829 B2
(45) Date of Patent: Feb. 28, 2017

(54) OPTIMIZATION OF LOW PROFILE ANTENNA(S) FOR EQUATORIAL OPERATION

(71) Applicant: Panasonic Avionics Corporation, Lake Forest, CA (US)

(72) Inventors: Benjamin Engel, Haifa (IL); Brinder Bhatia, Trabuco Canyon, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 438 days.

(21) Appl. No.: 14/174,535

(22) Filed: Feb. 6, 2014

(65) Prior Publication Data

US 2014/0225768 A1    Aug. 14, 2014

Related U.S. Application Data

(60) Provisional application No. 61/763,594, filed on Feb. 12, 2013.

(51) Int. Cl.
*H04B 7/185* (2006.01)
*H01Q 3/08* (2006.01)
(Continued)

(52) U.S. Cl.
CPC .............. *H01Q 3/08* (2013.01); *H01Q 1/125* (2013.01); *H01Q 3/26* (2013.01); *H04B 7/18519* (2013.01); *H01Q 1/28* (2013.01)

(58) Field of Classification Search
CPC ........... H01Q 3/08; H01Q 1/3275; H01Q 3/26
(Continued)

(56) References Cited

U.S. PATENT DOCUMENTS 3,810,185 A    5/1974    Wilkinson
4,197,548 A *  4/1980    Smith ...................... H01Q 1/18
                                                          343/757
(Continued)

FOREIGN PATENT DOCUMENTS

EP    0 089 084 B1    9/1983
EP    0 123 350 B1    10/1984
(Continued)

OTHER PUBLICATIONS

European Patent Office, Extended European Search Report, Application No. 14151568.4-1811/2765649, Dated Mar. 31, 2015.
(Continued)

*Primary Examiner* — Marcus Windrich
(74) *Attorney, Agent, or Firm* — Brian Furrer

(57) ABSTRACT

Systems and methods for optimizing low profile SATCOM antenna panels affixed to a moving vehicle. An elongated SATCOM antenna panel has a narrow azimuth beam optionally having a typical width of no more than a 2-degree angle while the SATCOM antenna panel is maintained parallel to the motion trajectory of a carrying vehicle. An actuation unit rotates the SATCOM antenna panel about three orthogonal axes: a longitudinal axis (Roll rotation), a vertical axis (Yaw rotation) and a lateral axis (Elevation rotation). The actuation unit actuates the antenna panel so it is maintained aligned with the Earth's equatorial plane and the narrow azimuth beam optionally having a typical width of no more than 2-degree angle eliminates adjacent satellite illumination.

20 Claims, 11 Drawing Sheets

(51) Int. Cl.
*H01Q 3/26* (2006.01)
*H01Q 1/12* (2006.01)
*H01Q 1/28* (2006.01)

(58) Field of Classification Search
USPC .......................... 342/354, 355, 357.395, 359
See application file for complete search history.

(56) References Cited

U.S. PATENT DOCUMENTS

| | | | |
|---|---|---|---|
| 4,263,598 A | 4/1981 | Bellee et al. | |
| 4,486,758 A | 12/1984 | de Ronde | |
| 4,527,165 A | 7/1985 | de Ronde | |
| 4,614,947 A | 9/1986 | Rammos | |
| 4,647,938 A | 3/1987 | Roederer et al. | |
| 4,679,051 A | 7/1987 | Yabu et al. | |
| 4,801,943 A | 1/1989 | Yabu et al. | |
| 5,089,824 A | 2/1992 | Uematsu et al. | |
| 5,245,348 A | 9/1993 | Nishikawa et al. | |
| 5,258,250 A | 11/1993 | Shirai et al. | |
| 5,309,162 A | 5/1994 | Uematsu et al. | |
| 5,398,035 A | 3/1995 | Densmore et al. | |
| 5,404,509 A | 4/1995 | Klein | |
| 5,420,598 A | 5/1995 | Uematsu et al. | |
| 5,508,731 A | 4/1996 | Kohorn | |
| 5,512,906 A | 4/1996 | Speciale | |
| 5,528,250 A | 6/1996 | Sherwood et al. | |
| 5,537,141 A | 7/1996 | Happer et al. | |
| 5,544,299 A | 8/1996 | Wenstrand et al. | |
| 5,579,019 A | 11/1996 | Uematsu et al. | |
| 5,596,336 A | 1/1997 | Liu | |
| 5,678,171 A | 10/1997 | Toyama et al. | |
| 5,712,644 A | 1/1998 | Kolak | |
| 5,739,788 A * | 4/1998 | Dybdal ................... H01Q 3/10 342/16 | |
| 5,740,035 A | 4/1998 | Cohen et al. | |
| 5,751,247 A | 5/1998 | Nomoto et al. | |
| 5,764,199 A | 6/1998 | Ricardi | |
| 5,767,897 A | 6/1998 | Howell | |
| 5,781,163 A | 7/1998 | Ricardi et al. | |
| 5,799,151 A | 8/1998 | Hoffer | |
| 5,801,754 A | 9/1998 | Ruybal et al. | |
| 5,823,788 A | 10/1998 | Lemelson et al. | |
| 5,835,057 A * | 11/1998 | van Heyningen ... H01Q 1/3216 342/359 | |
| 5,841,980 A | 11/1998 | Waters et al. | |
| 5,861,881 A | 1/1999 | Freeman et al. | |
| 5,872,545 A | 2/1999 | Rammos | |
| 5,878,214 A | 3/1999 | Gilliam et al. | |
| 5,880,731 A | 3/1999 | Liles et al. | |
| 5,886,671 A | 3/1999 | Riemer et al. | |
| 5,916,302 A | 6/1999 | Dunn et al. | |
| 5,917,310 A | 6/1999 | Baylis | |
| 5,929,819 A | 7/1999 | Grinberg | |
| 5,961,092 A | 10/1999 | Coffield | |
| 5,978,835 A | 11/1999 | Ludwig et al. | |
| 5,982,333 A | 11/1999 | Stillinger et al. | |
| 5,983,071 A | 11/1999 | Gagnon et al. | |
| 5,991,595 A | 11/1999 | Romano et al. | |
| 5,995,951 A | 11/1999 | Ferguson | |
| 5,999,208 A | 12/1999 | Mcnerney et al. | |
| 6,002,364 A * | 12/1999 | Kroeger ............... H01Q 1/1257 342/359 | |
| 6,049,306 A | 4/2000 | Amarillas | |
| 6,061,082 A | 5/2000 | Park | |
| 6,061,440 A | 5/2000 | Delaney et al. | |
| 6,061,716 A | 5/2000 | Moncreiff | |
| 6,064,978 A | 5/2000 | Gardner et al. | |
| 6,074,216 A | 6/2000 | Cueto | |
| 6,078,948 A | 6/2000 | Podgorney et al. | |
| 6,120,534 A | 9/2000 | Ruiz | |
| 6,124,832 A | 9/2000 | Jeon et al. | |
| 6,160,520 A | 12/2000 | Muhlhauser et al. | |
| 6,169,522 B1 | 1/2001 | Ma et al. | |
| 6,175,340 B1 * | 1/2001 | Olds ........................ H01Q 3/08 343/824 | |
| 6,184,828 B1 | 2/2001 | Shoki | |
| 6,191,734 B1 | 2/2001 | Park et al. | |
| 6,195,060 B1 | 2/2001 | Spano et al. | |
| 6,204,823 B1 | 3/2001 | Spano et al. | |
| 6,218,999 B1 | 4/2001 | Bousquet et al. | |
| 6,249,809 B1 | 6/2001 | Bro | |
| 6,256,663 B1 | 7/2001 | Davis | |
| 6,259,415 B1 | 7/2001 | Kumpfbeck et al. | |
| 6,263,160 B1 * | 7/2001 | Lewis .................... G03B 15/00 248/550 | |
| 6,297,774 B1 | 10/2001 | Chung | |
| 6,304,861 B1 | 10/2001 | Ferguson | |
| 6,331,837 B1 | 12/2001 | Shattil | |
| 6,347,333 B2 | 2/2002 | Eisendrath et al. | |
| 6,407,714 B1 | 6/2002 | Butler et al. | |
| 6,442,590 B1 | 8/2002 | Inala et al. | |
| 6,483,472 B2 | 11/2002 | Cipolla et al. | |
| 6,486,845 B2 | 11/2002 | Ogawa et al. | |
| 6,496,158 B1 | 12/2002 | Ksienski et al. | |
| 6,578,025 B1 | 6/2003 | Pollack et al. | |
| 6,621,453 B2 * | 9/2003 | Ring ....................... G01S 19/53 244/164 | |
| 6,624,787 B2 | 9/2003 | Puzella et al. | |
| 6,657,589 B2 | 12/2003 | Wang et al. | |
| 6,661,388 B2 | 12/2003 | Desargant et al. | |
| 6,677,908 B2 | 1/2004 | Strickland | |
| 6,707,432 B2 | 3/2004 | Strickland | |
| 6,738,024 B2 | 5/2004 | Butler et al. | |
| 6,765,542 B2 | 7/2004 | McCarthy et al. | |
| 6,771,225 B2 | 8/2004 | Tits | |
| 6,778,144 B2 | 8/2004 | Anderson | |
| 6,792,448 B1 | 9/2004 | Smith | |
| 6,822,612 B2 | 11/2004 | Takimoto et al. | |
| 6,839,039 B2 | 1/2005 | Tanaka et al. | |
| 6,861,997 B2 | 3/2005 | Mahon | |
| 6,864,837 B2 | 3/2005 | Runyon et al. | |
| 6,864,846 B2 | 3/2005 | King | |
| 6,873,301 B1 | 3/2005 | Lopez | |
| 6,897,806 B2 | 5/2005 | Toshev | |
| 6,950,061 B2 | 9/2005 | Howell et al. | |
| 6,999,036 B2 | 2/2006 | Stoyanov et al. | |
| 7,061,432 B1 | 6/2006 | Hozouri | |
| 7,123,876 B2 * | 10/2006 | Wang ..................... H01Q 1/3275 342/354 | |
| 7,253,777 B2 | 8/2007 | Blaschke et al. | |
| 7,382,329 B2 | 6/2008 | Kim | |
| 7,385,562 B2 | 6/2008 | Stoyanov et al. | |
| 7,492,322 B2 | 2/2009 | Jung et al. | |
| 7,595,762 B2 | 9/2009 | Mansour | |
| 7,629,935 B2 | 12/2009 | Mansour et al. | |
| 7,663,566 B2 | 2/2010 | Engel | |
| 7,768,469 B2 | 8/2010 | Mansour et al. | |
| 7,821,355 B2 | 10/2010 | Engel | |
| 7,994,994 B2 | 8/2011 | Engel | |
| 7,999,750 B2 | 8/2011 | Mansour et al. | |
| 8,185,045 B2 | 5/2012 | Mansour | |
| 8,314,735 B2 * | 11/2012 | Park ..................... H01Q 1/3275 342/357.63 | |
| 8,564,499 B2 * | 10/2013 | Bateman ............... H01Q 1/125 343/880 | |
| 2001/0026245 A1 | 10/2001 | Cipolla et al. | |
| 2002/0072955 A1 | 6/2002 | Brock | |
| 2002/0128898 A1 | 9/2002 | Smith et al. | |
| 2002/0194054 A1 | 12/2002 | Erengut | |
| 2003/0067410 A1 | 4/2003 | Puzella et al. | |
| 2003/0080898 A1 * | 5/2003 | Wang ..................... H01Q 1/3275 342/359 | |
| 2003/0088458 A1 | 5/2003 | Afeyan et al. | |
| 2003/0122724 A1 | 7/2003 | Shelley et al. | |
| 2004/0178476 A1 | 9/2004 | Boyanov et al. | |
| 2004/0233122 A1 | 11/2004 | Espenscheid et al. | |
| 2005/0057396 A1 | 3/2005 | Boyanov | |
| 2005/0146473 A1 | 7/2005 | Stoyanov et al. | |
| 2005/0259021 A1 | 11/2005 | Stoyanov et al. | |
| 2005/0259201 A1 | 11/2005 | Hu et al. | |
| 2006/0132372 A1 | 6/2006 | Jung et al. | |

(56) References Cited

U.S. PATENT DOCUMENTS

| | | | |
|---|---|---|---|
| 2006/0152410 A1* | 7/2006 | Shi | H01Q 1/28 342/359 |
| 2006/0197713 A1 | 9/2006 | Mansour et al. | |
| 2006/0244669 A1 | 11/2006 | Mansour et al. | |
| 2007/0085744 A1 | 4/2007 | Engel | |
| 2007/0146222 A1 | 6/2007 | Mansour | |
| 2010/0188304 A1* | 7/2010 | Clymer | H01Q 1/185 343/753 |
| 2010/0315288 A1* | 12/2010 | Liu | H04B 7/086 342/359 |

FOREIGN PATENT DOCUMENTS

| | | |
|---|---|---|
| EP | 0 481 417 B1 | 4/1992 |
| EP | 0 518 271 A1 | 12/1992 |
| EP | 0 520 424 A2 | 12/1992 |
| EP | 0 546 513 A1 | 6/1993 |
| EP | 0 557 853 A1 | 9/1993 |
| EP | 1 604 427 B1 | 2/2004 |
| JP | 62-173807 A | 7/1987 |
| JP | 63-108805 A | 5/1988 |
| JP | 63-171003 A | 7/1988 |
| JP | 63-174411 A | 7/1988 |
| JP | 02-137402 A | 5/1990 |
| JP | 03-247003 A | 11/1991 |
| JP | 06-069712 A | 3/1994 |
| JP | 06-237113 A | 8/1994 |
| JP | 08-321715 A | 12/1996 |
| JP | 2005-181149 | 7/2005 |
| WO | WO 89/09501 A1 | 10/1989 |
| WO | WO 00/75829 A1 | 12/2000 |
| WO | WO 01/11718 A1 | 2/2001 |
| WO | WO 01/84266 A2 | 11/2001 |
| WO | WO 01/84266 A3 | 11/2001 |
| WO | WO 02/19232 A1 | 3/2002 |
| WO | WO 02/057986 A2 | 7/2002 |
| WO | WO 02/097919 A1 | 12/2002 |
| WO | WO 02/103842 A1 | 12/2002 |
| WO | WO 03/052868 A1 | 6/2003 |
| WO | WO 03/096576 A1 | 11/2003 |
| WO | WO 2004/042492 A2 | 5/2004 |
| WO | WO 2004/042492 A3 | 5/2004 |
| WO | WO 2004/075339 A2 | 9/2004 |
| WO | WO 2004/079859 A1 | 9/2004 |
| WO | WO 2004/079861 A1 | 9/2004 |
| WO | WO 2004/097972 A1 | 11/2004 |
| WO | WO 2005/004284 A1 | 1/2005 |
| WO | WO 2005/067098 A1 | 7/2005 |
| WO | WO 2007/046055 A2 | 4/2007 |
| WO | WO 2007/063434 A2 | 6/2007 |

OTHER PUBLICATIONS

Communication Pursuant to Article 94(3) EPC Appln. No. 04712141.3, Oct. 28, 2008.
Communication Pursuant to Article 94(3) EPC Appln. No. 06809614.8, Aug. 25, 2008.
Communication Pursuant to Article 94(3) EPC Appln. No. 06809614.8, Jul. 22, 2009.
Communication Pursuant to Article 94(3) EPC Appln. No. 06809614.8, Feb. 16, 2010.
Communication Pursuant to Article 94(3) EPC Appln. No. 06809615.5, Sep. 4, 2009.
Communication Pursuant to Article 94(3) EPC Appln. No. 06809615.5, Mar. 1, 2010.
Communication Pursuant to Article 96(2) EPC Appln. No. 04712141.3, Oct. 4, 2006.
Communication Pursuant to Rules 161 and 162 EPC Appln. No. 06809614.8, May 26, 2008.
Response to Communication Pursuant to Article 94(3) EPC of Jul. 22, 2009 Appln. No. 06809614.8, Nov. 9, 2009.
Response to Communication Pursuant to Article 94(3) EPC of Aug. 25, 2008 Appln. No. 06809614.8, Feb. 10, 2009.
Response to Communication Pursuant to Article 94(3) EPC of Feb. 16, 2010 Appln. No. 06809614.8, May 31, 2010.
Response to Communication Pursuant to Article 94(3) EPC of Mar. 1, 2010 Appln. No. 06809615.5, Jun. 28, 2010.
Response to Communication Pursuant to Article 94(3) EPC of Sep. 4, 2009 Appln. No. 06809615.5, Dec. 27, 2009.
Response to Communication Pursuant to Rules 161 and 162 EPC dated May 26, 2008, Appln. No. 06809614.8, Jul. 14, 2008.
Supplementary European Search Report and the European Search Opinion Appln. No. 06809615.5, Jul. 6, 2009.
Supplementary European Search Report Appln. No. 04712141.3, Dec. 23, 2005.
Office Action, Appln. No. 154525, May 20, 2010.
Office Action, Appln. No. 154525, Feb. 25, 2007.
Office Action, Appln. No. 154525, Mar. 19, 2008.
Office Action, Appln. No. 154525, Nov. 23, 2008.
Office Action, Appln. No. 171450, May 2, 2010.
Office Action, Appln. No. 171450, May 3, 2009.
Translation of Notification of Reasons of Rejection Appln. No. 2006-502642, Jan. 21, 2009.
Translation of Notification of Reasons of Rejection Appln. No. 2006-502642, Mar. 26, 2010.
Response to Notification of Reasons of Rejection of Mar. 26, 2010 Appln. No. 2006-502642, Jun. 20, 2010.
International Preliminary Report on Patentability, PCT/IB2006/053805, Mar. 14, 2008.
International Preliminary Report on Patentability, PCT/IB2006/053806, Jan. 22, 2009.
International Preliminary Report on Patentability, PCT/IL2004/000149, May 27, 2005.
International Preliminary Report on Patentability, PCT/IL2005/000020, Jul. 10, 2009.
International Search Report and Written Opinion of the International Searching Authority, PCT/IB2006/53806, Jul. 30, 2008.
International Search Report, PCT/IB2006/053805, Oct. 9, 2007.
International Search Report, PCT/IL2004/000149, Oct. 14, 2004.
International Search Report, PCT/IL2005/000020, Apr. 20, 2005.
Written Opinion From the International Searching Authority, PCT/EP2006/053805, Oct. 9, 2007.
Written Opinion From the International Searching Authority, PCT/IL2005/000020, Apr. 20, 2005.
Written Opinion From the International Searching Authority, PCT/IL2004/000149, Oct. 14, 2004.
Notice of Allowance, U.S. Appl. No. 10/546,264, Aug. 4, 2009.
Notice of Allowance, U.S. Appl. No. 11/477,600, Apr. 2, 2010.
Office Action, U.S. Appl. No. 10/546,264, Dec. 24, 2008.
Office Action, U.S. Appl. No. 11/440,054, Feb. 24, 2009.
Office Action, U.S. Appl. No. 11/477,600, Feb. 5, 2009.
Office Action, U.S. Appl. No. 11/477,600, Nov. 30, 2009.
Office Action, U.S. Appl. No. 11/580,306, Jul. 14, 2008.
Response to Jul. 14, 2008 Office Action, U.S. Appl. No. 11/580,306, Dec. 15, 2008.
Response to Dec. 24, 2008 Office Action, U.S. Appl. No. 10/546,264, Mar. 24, 2009.
Response to Feb. 5, 2009 Office Action, U.S. Appl. No. 11/477,600, Aug. 5, 2009.
Response to Feb. 24, 2009 Office Action, U.S. Appl. No. 11/440,054, Mar. 23, 2009.
Response to Nov. 30, 2009 Office Action, U.S. Appl. No. 11/477,600, Apr. 8, 2010.
Declaration of Messrs. Micha Lawrence and David Levy (Jan. 10, 2006) including Exhibits, Sep. 2003 Public Display in Seattle, Washington, 24 pages.
Felstead, "Combining Multiple Sub-Apertures for Reduced-Profile Shipboard Satcom-Antenna Panels", Communications Research Centre, Ottawa, Canada, 2001, pp. 665-669.
Ito et al., "A Mobile 12 GHz DBS Television Receiving System", IEEE Transactions on Broadcasting, Mar. 1989, vol. 35. No. 1, pp. 56-61.
LeVine et al., "Component Design Trends—Dual-Mode Horn Feed for Microwave Multiplexing," Electronics, Sep. 1954, vol. 27, pp. 162-164.

(56) References Cited

OTHER PUBLICATIONS

MR-Live "MR-Live-Take the Pulse of Your Market", Product Overview, 2001, 11 Pages.
NetOnCourse, "Harnessing the Value of Mass E-Gathering", www.netoncourse.com, 2000, 12 Pages.
NetOnCourse, "NetOnCourse. Masters of Future Think", 1999, 4 Pages.
Peeler et al., "A Two-Dimensional Microwave Luneberg Lens", I.R.E. Transactions—Antennas and Propagation, 1953, pp. 12-23.
Peeler et al., "Microwave Stepped-Index Luneberg Lenses", IRE Transactions on Antennas and Propagation, 1957, pp. 202-207.
Peeler et al., "Virtual Source Luneberg Lenses", I-R-E Transactions—Antennas and Propagation, 1953, pp. 94-99.
Stuchly et al., "Wide-Band Rectangular to Circular Waveguide Mode and Impedance Transformer," IEEE Transactions on Microwave Theory and Techniques, May 1965, vol. 13, pp. 379-380.

\* cited by examiner

OPTIMIZATION OF LOW PROFILE ANTENNA(S) FOR EQUATORIAL OPERATION

CROSS-REFERENCE TO RELATED APPLICATIONS

This application claims priority from U.S. Provisional Patent Application No. 61/763,594, filed Feb. 12, 2013. Priority from the foregoing provisional application is expressly claimed and the disclosure thereof is incorporated herein by reference in its entirety and for all purposes.

BACKGROUND

The present invention, in some embodiments thereof, relates to mobile satellite communications (SATCOM) antenna systems and optimized methods for satellite communications, and more specifically, but not exclusively, to systems and methods for optimizing low profile elongated SATCOM antenna panels for Earth's equatorial plane operation.

As used herein, the term elongated refers to a longitudinally oriented antenna affixed parallel to a longitudinal axis of a carrying vehicle traveling in continuous trajectory defining a path causing the vehicle to travel forward on the longitudinal axis.

Geostationary satellite communication technologies provide a variety of services including broadband communications, audio/video distribution networks, maritime, terrestrial and aerial navigation, as well as support for civilian and military operations.

Military communication antennas are utilized by armed forces for both stationary and mobile satellite systems. In addition to conventional antennas, military antennas are also essential to tactical communications from distant, airborne, maritime and environmentally harsh locations. Some particular requirements of military communication antennas are low profile, high reliability, ruggedness, immunity to jamming, portability, etc. A predominant example of a military geostationary satellite system is the Military Strategic and Tactical Relay (MILSTAR).

As used herein, the term antenna refers to a device that transforms directed electromagnetic signals into electromagnetic waves propagating in free space. An antenna may be used for both reception and transmission of signals.

As used herein, the term geostationary or geosynchronous orbit (GSO) refers to a circular orbital path along and approximately 35,786 kilometers above the Earth's equator. Geostationary orbits lie on the Earth's equatorial plane.

Satellites orbiting at the same speed as the rotational speed of the Earth share a common latitude on the Earth's equatorial plane and are uniformly parked along the longitudinal axis in an orbital arc sometimes called the Clark belt. At such an orbit, the orbital period of a satellite is 1 day, i.e., equal to the rotational period of the Earth.

As used herein, the term communications satellite refers to a satellite that predominantly provides digital and/or radio and or television and/or phone coverage. Such a satellite is utilized as a relay station in orbit above the Earth, receiving amplifying, and forwarding signals carried on specific electromagnetic radio frequency band(s). The satellite remains above certain area(s) with specific footprint(s) on the Earth's surface as it revolves around the Earth in a geostationary orbit.

The design and development of SATCOM antenna systems (SAS) has been one of the areas in communications that has experienced significant growth in the past decades. Today, a range of SAS models exist, designed for ground, spacecraft, super-sonic, sub-sonic, maritime, helicopter and unmanned aerial vehicle (UAV) platforms.

Such a SAS may be affixed to various locations on the body or fuselage of the vehicle, facilitating communications between the vehicle and a geostationary satellite.

FIG. 1 illustrates an exemplary environment 900 of a geostationary satellite communicating with an elongated SATCOM antenna panel affixed to an aircraft. FIG. 2 is an environment 902 illustrating flight dynamics parameters and axes of rotation in a three-dimensional space adopting the alta-azimuth coordinate system. The figures describe an exemplary aircraft 300 in a three-dimensional space and three orthogonal axes of rotation 400 about the aircraft's center of mass: a longitudinal axis 402, a lateral axis 404 and a vertical axis 406.

As used herein, the axes are respectively referred to as a roll rotation, an elevation rotation and a yaw rotation (azimuth). Utilizing this convention, a roll rotation refers to as acting about the longitudinal axis; an elevation rotation is acting about the lateral axis and a yaw rotation is acting about the vertical axis.

With reference to FIG. 1, as is commonly known, a geostationary satellite 100 is orbiting Earth in an orbit plane 132 at an elevation of approximately 35,786 kilometers forming an angle 104, of θ degrees between planes 110 perpendicular to the surface of the Earth. Irrespective of the type of signal employed, the geostationary satellite 100 is a communications relay device, located in space to re-broadcast signals to a much larger area than is possible by, for instance, only a local area transmission.

The designed purpose of geostationary satellites dictates the frequency bands of operation, types of transmissions, power levels emitted and where their signal(s) are directed. Some regions on Earth, such as region 108 are unreachable by the geostationary satellite 100 due to the limiting angle 104 formed between the satellite and planes 110 perpendicular to the Earth's surface. Also depicted is an exemplary aircraft 300, affixed with a SAS 500 that may bi-directionally communicate with the geostationary satellite 100.

Any satellite position in a geostationary orbit is determined by two coordinates which stand for the satellite's horizontal and vertical locations. Referring to FIG. 2, the vertical coordinate is resolved by calculating an altitude angle 414 upwards from the nearest point on the horizon, and the horizontal coordinate is determined by calculating an azimuth angle 412 from due north eastwards along the horizon to that nearest point. As used herein, the abovementioned coordinate system is referred to as the alta-azimuth coordinate system and is commonly known in the arts as the astronomical and/or the horizon coordinate system.

SUMMARY

According to some embodiments of the present invention, there is provided a system for communication with a geostationary satellite, including an elongated satellite communications (SATCOM) antenna panel sized and shaped to radiate a narrow azimuth beam (NAB) having a typical width of no more than a 2-degree angle, and an actuation unit that rotates the elongated SATCOM antenna panel about a longitudinal axis parallel to the elongated SATCOM antenna panel to impart an elevation rotation, about a lateral axis orthogonal to the longitudinal axis to impart a roll rotation and about a vertical axis orthogonal to the lateral axis to impart a yaw rotation.

Optionally, wherein the actuation unit independently controls a plurality of orthogonal actuators in which each of the plurality of orthogonal actuators independently tilts the elongated SATCOM antenna panel about at least one of the longitudinal axis, the lateral axis and the vertical axis.

Optionally, wherein the actuation unit imparts reversing of first axis of rotation with second orthogonal axis of rotation.

Optionally, wherein the NAB having a typical width of no more than a 2-degree angle is generated as a conical beam emitted to intersect two points on a geostationary orbit such that the NAB having a typical width of no more than a 2-degree angle formed between origins of projections along the conical beam, targets only one satellite.

Optionally, wherein the elongated SATCOM antenna panel includes a plurality of electromagnetic active regions each independently receives and emits an electromagnetic signal phase and electromagnetic signal amplitude.

Optionally, wherein the elongated SATCOM antenna panel receives and transmits multiple electromagnetic signals in frequency bands of interest.

Optionally, wherein the actuation unit receives three dimensional (3D) coordinates of a carrying vehicle, and wherein upon approaching Earth's equatorial plane, the elongated SATCOM antenna panel is maintained aligned with the Earth's equatorial plane by the actuation unit and parallel to a motion trajectory of the carrying vehicle, maintaining the elongated SATCOM antenna panel aligned with Earth's equatorial plane and in parallel to a motion trajectory of the carrying vehicle.

Optionally, wherein certain ones of the plurality of orthogonal actuators include a motor, generating rotational forces and moments about center of gravity of the carrying vehicle, wherein each certain one of the plurality of orthogonal actuators autonomously exerts forces in three dimensional space.

Optionally, wherein the actuation unit regulates timing, power, torque and direction of a certain of the plurality of orthogonal actuators.

Optionally, wherein the reversing operates the elongated SATCOM antenna panel to be aligned along a radome and perpendicular to Earth's equatorial plane on routes external to the Earth's equatorial plane reducing degradation of the NAB having a typical width of no more than a 2-degree angle.

Optionally, wherein an electronic steering controller independently regulates the electromagnetic signal phase and the electromagnetic signal amplitude of certain of a plurality of the electromagnetic active regions.

Optionally, wherein the multiple electromagnetic signals in frequency bands of interest are Ku-band signals.

Optionally, wherein the multiple electromagnetic signals in frequency bands of interest are at least one of an L band (1 GHz to 2 GHz), an S band (2 GHz to 3 GHz), a C band (4 GHz to 7 GHz), an X band (8 GHz to 11 GHz) and a Ka band (17 GHz to 21 GHz and 27 GHz to 31 GHz).

According to some embodiments of the present invention, there is provided a computer-implemented method for reversing a first axis of rotation with a second orthogonal axis of rotation including receiving using a processor status information indicative of whether an elongated SATCOM antenna panel is outside Earth's equatorial plane, and transmitting instructions for reversing the first axis and the second orthogonal axis, and wherein the reversing allows the elongated SATCOM antenna panel to be aligned along a radome and perpendicular to the Earth's equatorial plane on routes external to the Earth's equatorial plane reducing degradation of a narrow azimuth beam having a typical width of no more than a 2-degree angle.

Optionally, further including
receiving three dimensional coordinates of a carrying vehicle.

Optionally, further including
transmitting instructions for steering the electromagnetic signal phase and electromagnetic signal amplitude of electromagnetic active regions on the elongated SATCOM antenna panel.

According to some embodiments of the present invention, there is provided a computer program product including a non-transitory computer usable storage medium having computer readable program code embodied in the medium for reversing a first axis of rotation with a second orthogonal axis of rotation, the computer program product including first computer readable program code for enabling a processor to receiving status information indicative of whether an elongated SATCOM antenna panel is outside Earth's equatorial plane, second computer readable program code for enabling a processor to reverse the first axis and the second orthogonal axis, and wherein the reversing allows an elongated SATCOM antenna panel to be aligned along a radome and perpendicular to the Earth's equatorial plane on routes external to the Earth's equatorial plane reducing degradation of a narrow azimuth beam having a typical width of no more than a 2-degree angle.

According to some embodiments of the present invention, there is provided a computer-implemented method for using an elongated SATCOM antenna panel illuminating a single satellite from an array of satellites on a geosynchronous orbit about the Earth, including locating the satellite, using a processor, receiving coordinates of a carrying vehicle, maintaining an elongated SATCOM antenna panel aligned with Earth's equatorial plane and in parallel to a motion trajectory of the carrying vehicle, and using the elongated SATCOM panel to radiate a narrow azimuth beam (NAB) having a typical width of no more than a 2-degree angle thereby to illuminate a single satellite from an array of satellites in the geosynchronous orbit about the Earth.

Optionally, further including transmitting instructions for steering the electromagnetic signal phase and electromagnetic signal amplitude of electromagnetic active regions on the elongated SATCOM antenna panel.

Optionally, wherein the locating includes
tracking a tracking signal transmitted from the single satellite, wherein the tracking signal transmitted from a transmitter aboard the single satellite is indicative of a position of the single satellite, and wherein the array of satellites orbiting in the geosynchronous orbit about the earth such that the elongated SATCOM antenna panel is adapted to track the single satellite within predetermined geosynchronous satellite parking slots having a separation of at least a 2-degree angle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
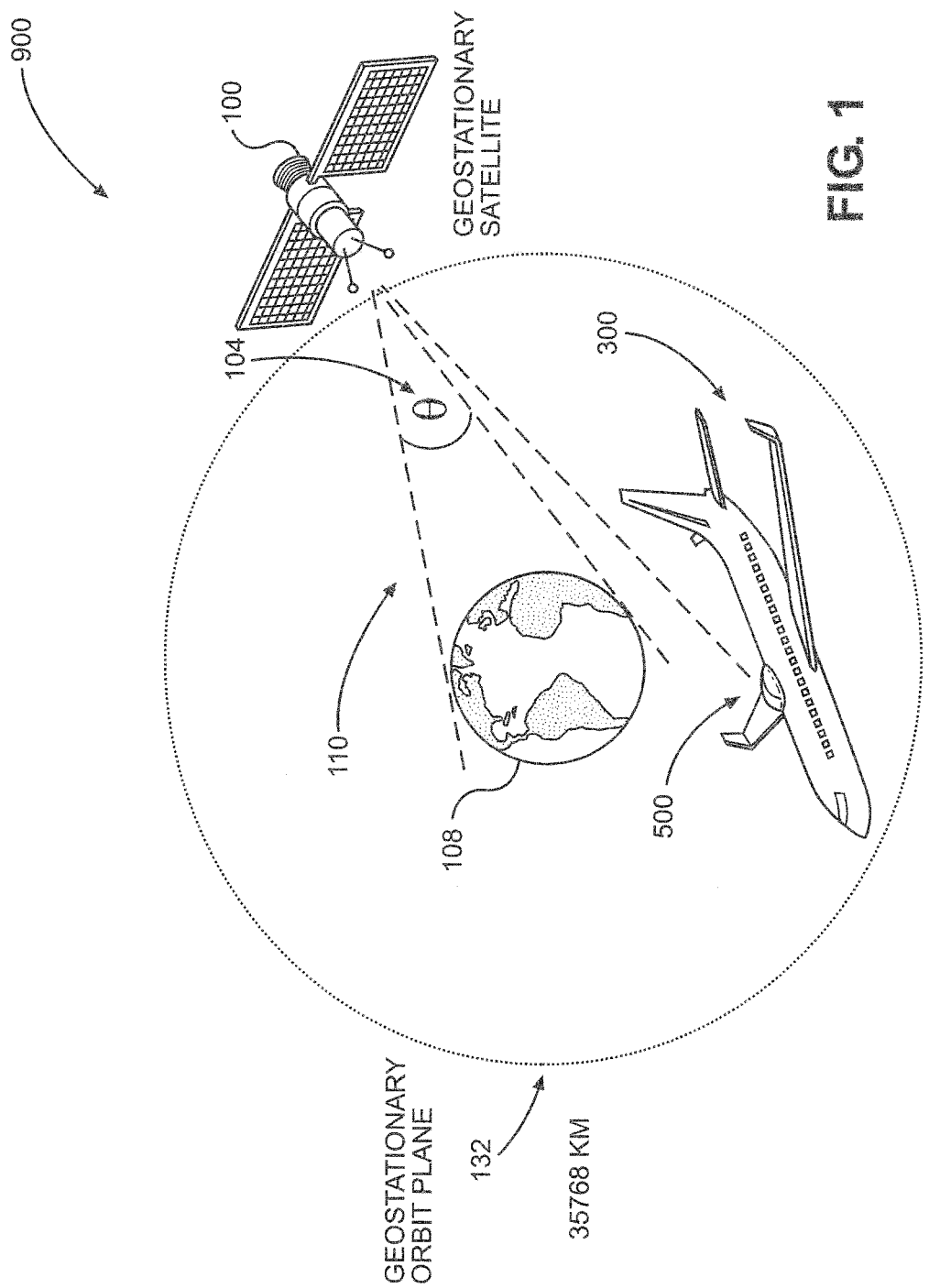
FIG. 1 is an illustration of an exemplary environment for a geostationary satellite communicating with an elongated SATCOM antenna panel coupled to an aircraft.

The present invention, in some embodiments thereof, relates to SAS and more specifically, but not exclusively, to low profile elongated SATCOM antenna panel for Equatorial operation.

According to some embodiments of the present invention, there are provided systems with one or more elongated SATCOM antenna panel for communicating with a geostationary satellite and methods of controlling elongated SATCOM antenna panel(s) and optimizing them for geostationary operation.

The systems and methods taught herein take the approach that it is desirable to leverage third axes of rotation, namely the roll rotation thus extending the elongated SATCOM antenna panel movement range.

Leveraging a third axis of rotation may provide benefits such as generating a narrow azimuth beam and decreasing communications disconnections. Optionally, the used elongated SATCOM antenna panel may radiate a narrow azimuth beam (NAB) optionally having a typical width of no more than 2-degree angle.

Any rotation of the aircraft minimally degrades the signal transmitted to the geostationary satellite and causes minute communications disconnections if any, because of the adjustments in the form of active counter-rotations imparted on the correct axes by the actuation unit.

As used herein, the term radome refers to housing or enclosure for an antenna. The enclosure is transparent to electromagnetic radio signals and may be sized and shaped to accommodate various performance and aerodynamic considerations. It may be composed of a robust polymeric and/or composite materials and the like.

The NAB may be a conical beam emitted to intersect two points on a geostationary orbit such that the NAB optionally has a width of no more than a 2-degree angle formed between the origins projections along the conical beam, targeting a single satellite. The satellite may be part of the satellites in an array of satellites in parking slots on a geostationary orbit.

The use of a NAB optionally having width of no more than a 2-degree angle may reduce adjacent satellite interference while the SAS is either in a transmitting and/or a receiving operation mode. Thus, the system may maintain communication with a specific satellite while the carrying vehicle freely moves in three dimensional space.

The SAS is mounted so that the elongated SATCOM antenna panel is placed to be parallel to the motion trajectory of a carrying vehicle. An actuation unit mechanically actuates the elongated SATCOM antenna panel in three orthogonal axes of rotation as described hereinabove.

In use, the actuation unit is instructed to rotate the elongated SATCOM antenna panel along the roll rotation axis so it is maintained aligned with the Earth's equatorial plane and the NAB width created may eliminate adjacent satellite illumination (ASI). Thus, the optimization of mechanical actuation on three multiple axes allow the elongated SATCOM antenna panel to continuously maintain alignment with the Earth's equatorial plane when the carrying vehicle is in movement and allows the actuation of the third additional roll rotation axis.

In some embodiments of the present invention, the following ranges are associated with the angular rotation around the axes: Azimuth (Yaw rotation) 0 to 360 degrees, Elevation rotation 0 to 90 degrees and roll rotation: −7 to +7 degrees.

Optionally, the system utilizes axes reversal that is adapted to reverse first axes of rotation with second orthogonal axes of rotation. Additionally, the actuation unit controls and triggers the axes reversal. The reversing operation allows the elongated SATCOM antenna panel to be aligned along the radome and perpendicular to the Earth's equatorial plane line even on routes external or near the Earth's equatorial plane reducing degradation of the NAB optionally having a typical width of no more than a 2-degree angle.

Thus in use, the system allows achieving beam width resolutions that are uniform across the entire geostationary orbit.

As used herein, the term near the Equator, refers to travelling within +/−(10 to 15) degrees Latitude (+N, −S), at elevation angles of no more than 25 degrees or less.

In some embodiments, the reversing operation is achieved by mechanical re-alignment of the SATCOM antenna panel, for instance, transposing the longitudinal and lateral axes results in re-alignment of the SATCOM antenna panel and subsequently a rotation on the longitudinal axis is now executed on the lateral axis and vice versa.

The actual range of latitudes in which axes reversal is triggered is determined dynamically by the system and depends, among other factors, on the actual antenna parameters such as azimuth and actual NAB width.

Optionally, the system includes an electronic steering controller that independently controls each of a plurality of electromagnetic active regions on the elongated SATCOM antenna panel and independently regulates the electromagnetic signal phase and electromagnetic signal amplitude of each electromagnetic active region. The electronic steering is an optimization that may improve discrimination of adjacent satellites. Improved satellite discrimination, may lead to the elimination of ASI. Optionally, the electronic steering is used in conjunction with the mechanical steering to extend further the electronic steering range.

The above-described vehicle mounted elongated SATCOM antenna panel is designed and produced so that it has a low profile and/or is lightweight, for example having a low drag flat panel aerodynamic shell that is suitable for mounting on the top of a vehicle, such as an aircraft, a boat, a submarine and/or a train. The low profile design improves suitability for aerodynamic enclosure without sacrificing a NAB width resolution, in relation to other antennas with similar abilities.

It should be noted that while embodiments of the present invention are described herein in terms of electromagnetic signals in the Ku band, a skilled artisan will appreciate that the embodiments are also applicable to other radio-frequency bands, such as, but not limited to the L band (1 gigahertz (GHz) to 2 GHz), the S band (2 GHz to 3 GHz), the C band (4 GHz to 7 GHz), the X band (7 GHz to 11 GHz) and the Ka band (17 GHz to 21 GHz and 27 GHz to 31 GHz).

As used herein, the term Ku band refers to an electromagnetic frequency band for satellite communication using frequencies of approximately 12 and 14 GHz for reception and transmission respectively.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to some embodiments of the present invention, there are provided systems with one or more elongated SATCOM antenna panel(s) for communicating with geostationary satellite and methods of controlling such elongated SATCOM antenna panel(s). In use, the elongated SATCOM antenna panel has a NAB optionally having a width corresponding to a 2-degree angle or less.

It should be noted, that wherever a coordinate system is referred to hereinafter, it is assumed that the carrying vehicle such as an aircraft, travels in a continuous trajectory defining a flight path causing the aircraft to travel forward on the longitudinal axis as depicted by numeral 402 of FIG. 2.

One of the axes around which the antenna panel is actuated is the roll rotation axis. The roll rotation axis is utilized in conjunction with two other orthogonal axes to reduce to a minimum unreachable regions formed between the NAB of the elongated SATCOM antenna panel and a geostationary satellite.

Optionally, the elongated SATCOM antenna panel continuously maintains alignment with the Earth's equatorial plane hence decreasing occurrences of intermittent communication disconnections with a geostationary satellite.

In addition, an actuation unit instructs an actuation mechanism, to reverse the any two orthogonal axes, for instance the elevation and the azimuth, to allow keeping an antenna aligned along the radome and perpendicular to the Earth's equatorial plane when the carrying vehicle is on routes external or near the Earth's equatorial plane reducing degradation of the NAB width resolution.

The elongated SATCOM antenna panel is designed and produced so that it has a flat panel, low profile and is lightweight, for example having a low drag aerodynamic shell that is suitable for mounting on the top of a vehicle, such as an aircraft, a boat, a submarine and/or a train. The low profile design improves suitability for aerodynamic enclosure without sacrificing a NAB width resolution, in relation to other antennas with similar abilities.

The antenna system is hereinafter discussed in conjunction with an aircraft, although it should be understood that the antenna system may be utilized in conjunction with other vehicles, such as a UAV, or a submarine and the like.

Figure 3:
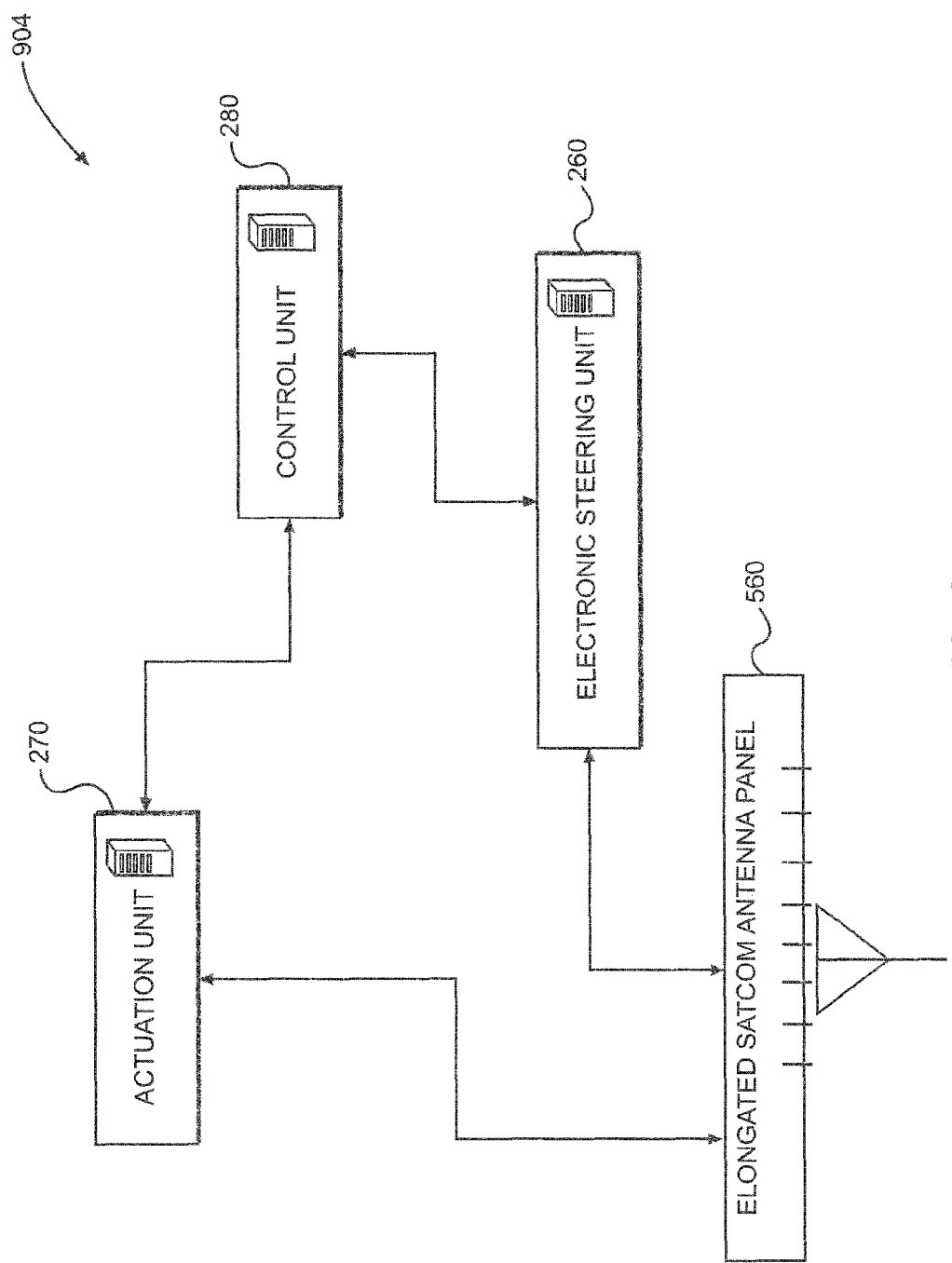
FIG. 3 is a block diagram of a simplified elongated SATCOM antenna panel, according to some embodiments of the present invention.

Referring now to FIG. 3, which is a block diagram 904 illustrating a SAS having an elongated SATCOM antenna panel 560 that is actuated about three perpendicular axes, according to some embodiments of the present invention. The ability to actuate the elongated SATCOM antenna panel about three perpendicular axes allows the SAS to reduce interferences from adjacent satellites.

A control unit 280 receives status information indicative of whether an elongated SATCOM antenna panel 560 is outside or near the Earth's equatorial plane and subsequently transmits instructions for reversing the roles of two axes to the actuation unit 270.

Optionally, the control unit 280 may transmit instructions for altering the electromagnetic signal phase and electromagnetic signal amplitude of electromagnetic active regions on the elongated SATCOM antenna panel 560. The system may be powered by one or more sources (not depicted), such as signal sources that are feeding active region sections of the elongated SATCOM antenna.

The actuation unit 270 controls a plurality of actuators, the actuation process, an axes reversal mechanism, the power supplied to each actuator and the coordination between each actuator. In use, the actuation mechanism (not depicted) is instructed by the actuation unit 270 to rotate the elongated SATCOM antenna panel around the roll rotation axis so it is maintained aligned with the Earth's equatorial plane and the NAB width created reduces and/or eliminates ASI. Under some embodiments of the present invention, each axis is driven by an individual servo motor which may be powered by either a single power source or multiple power sources, for example internal or external.

Optionally, the system includes an electronic steering controller 260 that independently controls one or more electromagnetic active regions on the SATCOM antenna panel 560 and regulates the electromagnetic signal phase and electromagnetic signal amplitude of each electromagnetic active region independently. Dynamically regulating the phase and amplitude of the electromagnetic active regions, may improve the discrimination ability of the antenna beam width leading to optimized elimination of ASI. More optionally, the electronic steering is augmented by mechanical steering to extend the angular range of the elongated SATCOM antenna panel 560.

Figure 4:
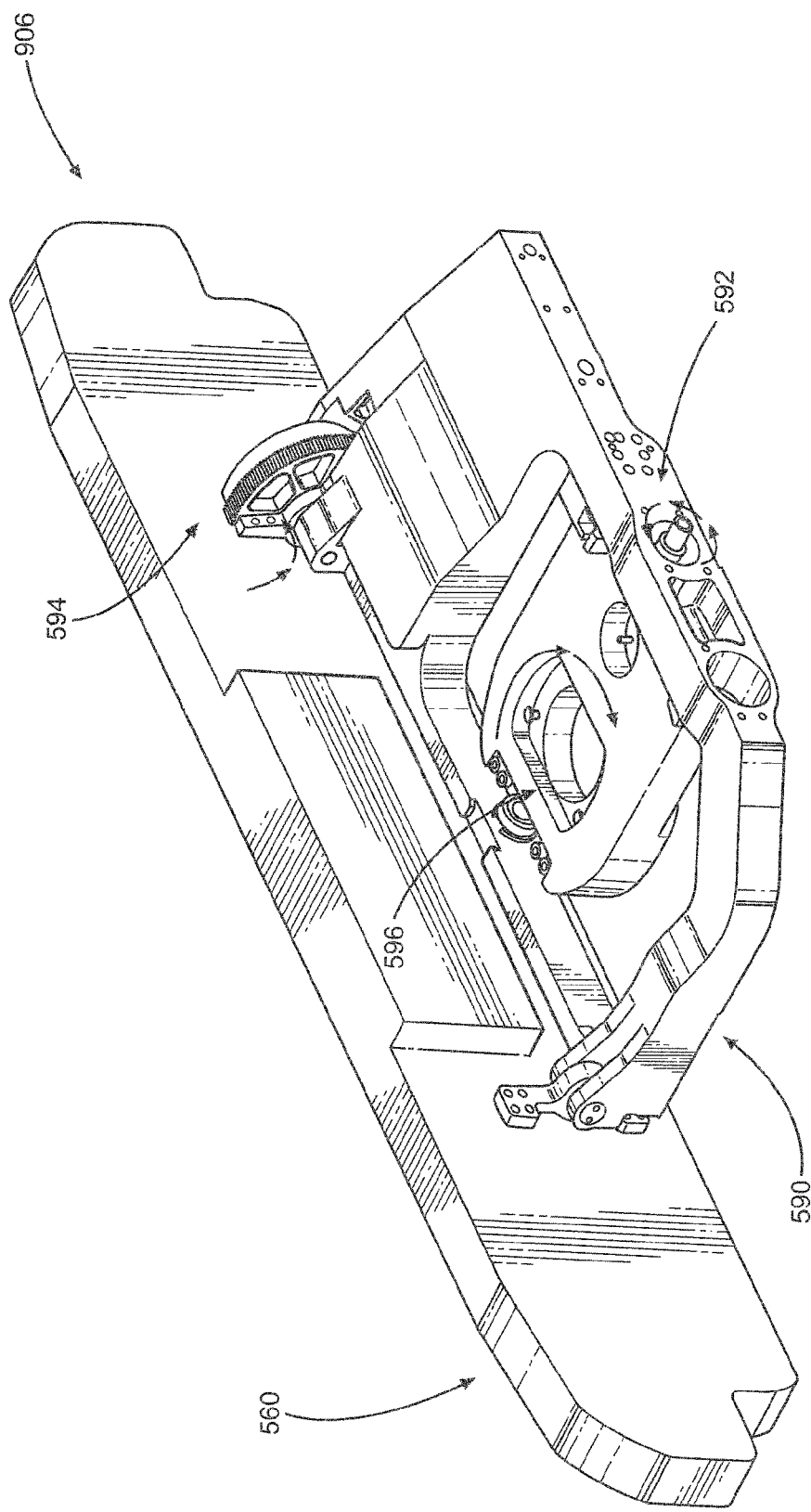
FIG. 4 is an illustration of a three dimensional view of an exemplary SATCOM antenna assembly, panel, electromagnetic active regions and base, according to some embodiments of the present invention.

Referring now to FIG. 4, which is an illustration of a three dimensional view 906 of an exemplary elongated SATCOM antenna assembly, panel, base and electromagnetic active region, according to some embodiments of the present invention.

An elongated SATCOM antenna panel 560, at rest, is perpendicular to an elongated SATCOM antenna panel base plate 590. The elongated SATCOM antenna panel 560 may comprise of a plurality of electromagnetic active regions exemplified in FIGS. 7-8 with numerals 550A, 550B and 550C.

The mechanical steering of the elongated SATCOM antenna panel 560 is based on three (3) degrees of freedom around the axes model. This configuration consists of three separate actuators that work independently of each other. Under some embodiments of the present invention, each axis is driven by its own actuator: a roll actuator 592, an azimuth actuator 596 and an elevation actuator 594.

Under some embodiments of the present invention, each axis is driven by an individual servo motor which may be powered by either a single power source and/or multiple power sources, for example internal or external.

As used herein, the term servo refers to any electric, hydraulic, nuclear, mechatronic or other type of motor, including brushed or brushless motor, linear and non-linear motor, embedded motor, and the like, that functions as the last control portion of an automatic feedback control system for mechanical motion.

To sustain servo actuation and SATCOM antenna panel 560 rotation as smooth as possible, bearings may be utilized at some or all of the mechanical gear interfaces inside the actuators. In addition, the actuator may utilize anti-backslash gears (not depicted) in order to minimize external forces which are exerted upon the actuator in a direction opposite its movement. For instance, drag inflicted on an aircraft may also be inflicted on the actuator.

Under some embodiments of the present invention each actuator comprise a motor, which generates rotational forces and moments about the center of gravity of a carrying vehicle. Moreover, each actuator may autonomously exert forces in three dimensional space.

The actuators may be connected to the elongated SATCOM antenna panel 560 along its exterior surface or may be integrated to the elongated SATCOM antenna panel 560 during manufacture. Regardless of the particular configuration of each actuator, as noted, the actuation is controlled by the actuation unit 280 of FIG. 3.

Under some embodiments of the present invention, each gear and or servo may be independently stabilized, for instance using a gyro. When the SATCOM antenna panel 560 and the carrying vehicle rotate, in response, each actuator may be individually instructed to exert force and/or moment in a direction such that it resists and compensates for the rotations of the carrying vehicle about its rotational axes.

Figure 5:
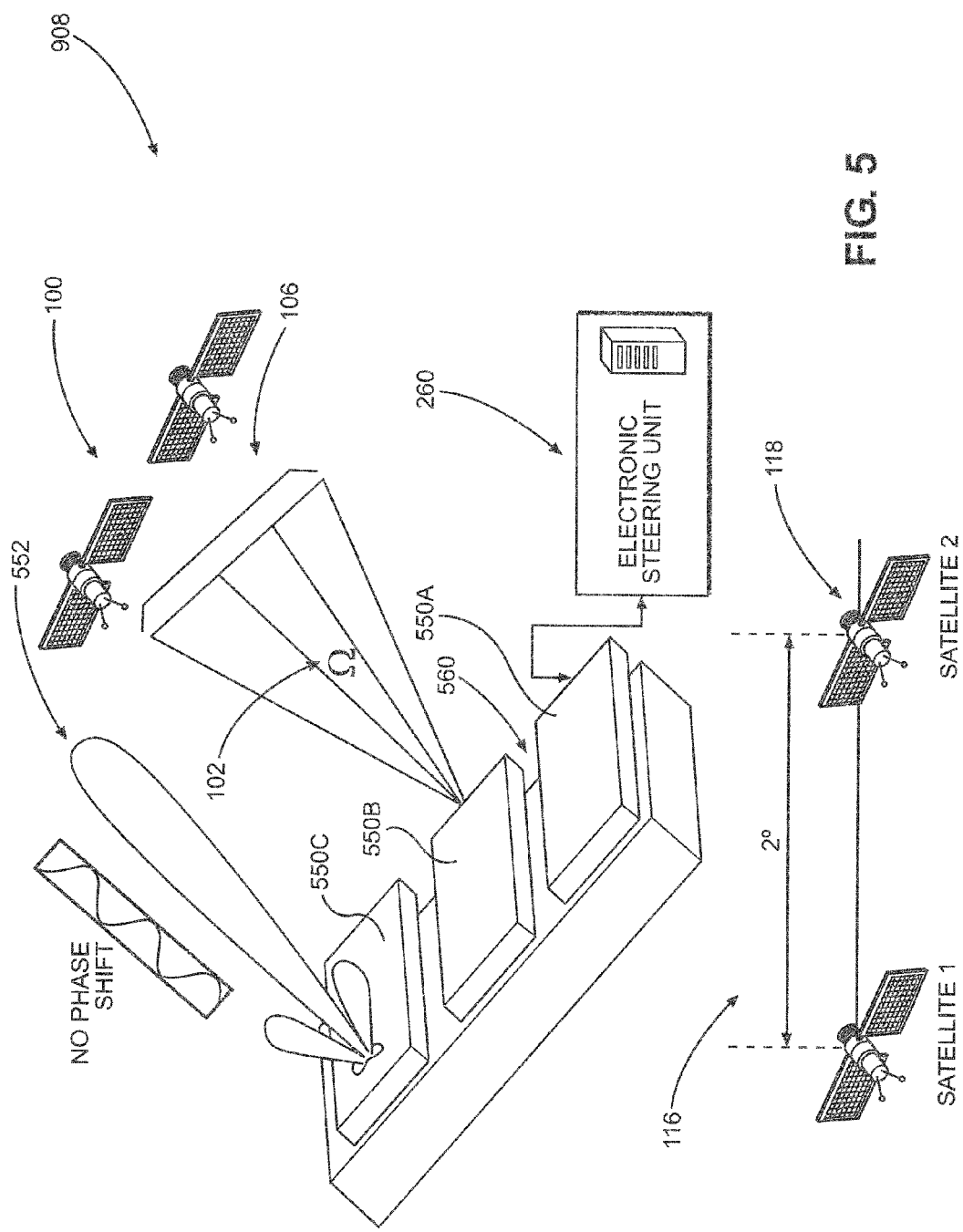
FIG. 5 is an illustration of an exemplary electronic steering process, according to some embodiments of the present invention.
Figure 6:
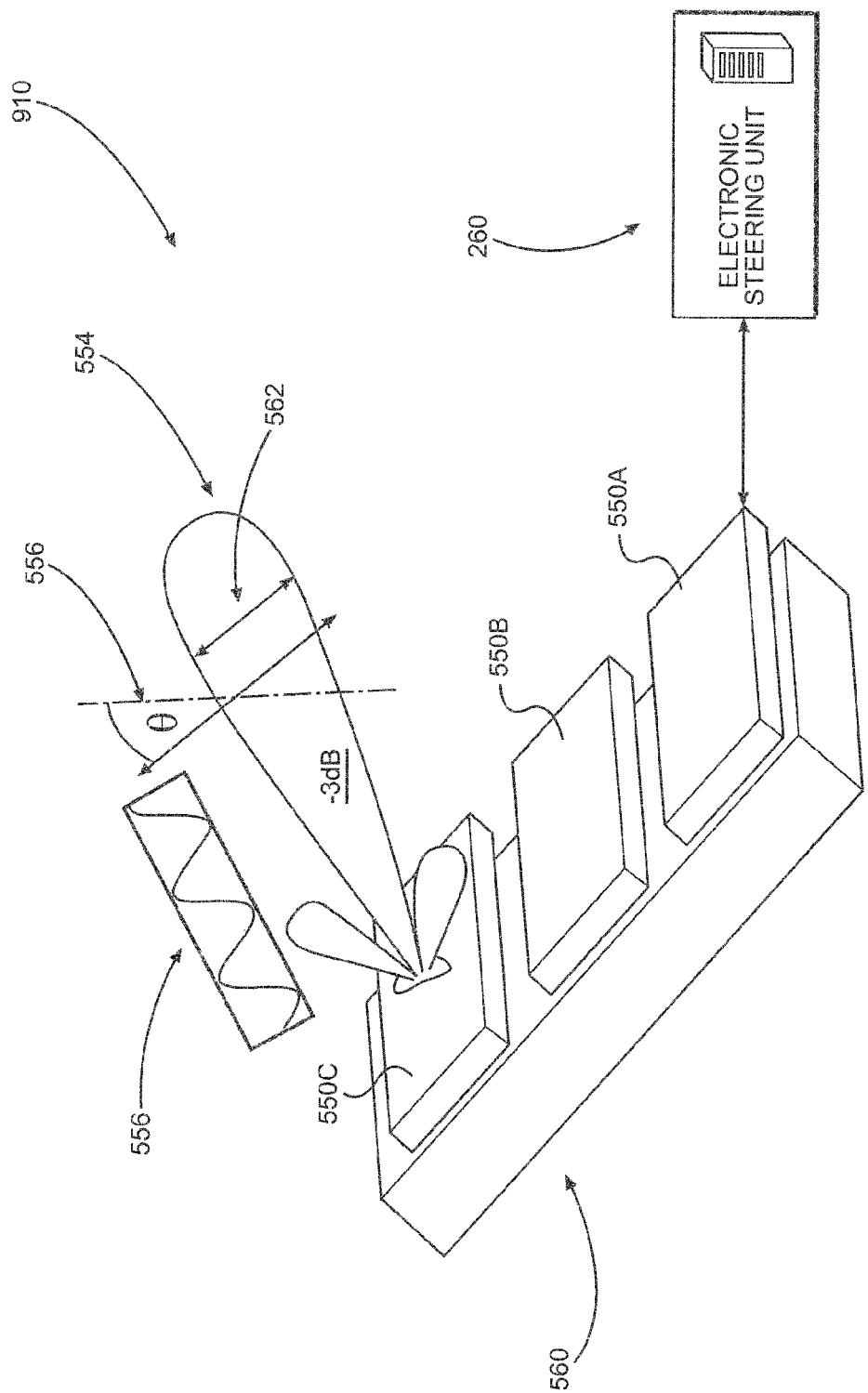
FIG. 6 is also an illustration of an exemplary electronic steering process, according to some embodiments of the present invention.

Referring now to FIGS. 5-6, which are illustrations of an exemplary electronic steering systems, 908 and 910, according to some embodiments of the present invention in order to demonstrate how a dynamic shift in phase and amplitude may improve adjacent satellite discrimination. FIG. 5 depicts a scenario under which no electronic steering is utilized and the amplitude and phase of the lobe 552 emitted from each of the active regions 550A, 550B and 550C is uniform and equal whereas FIG. 6 on the other hand, depicts a scenario in which one of the active regions 550C, is shifted electronically by an electronic steering unit 260 both in phase 556 and amplitude 562 resulting in the lobe 554. Azimuth resolution, as described hereinafter has a role in eliminating ASI by a SAS's NAB width 106. Azimuth resolution is determined by:

(a) the angle 102 of the elongated SATCOM antenna panel's NAB width 106, as depicted represented by the Greek letter f, (b) the distance between the elongated SATCOM antenna panel and the satellite, and (c) the width of the satellite orbit strip illuminated by the elongated SATCOM antenna NAB. For a NAB to resolve two satellites the satellites must be separated in the azimuth direction by a distance greater than the NAB width 106.

To accommodate the number of satellites required by the communications industry, communications satellites are being clustered into tight two (2) degree 112 parking orbits. With more than several hundred satellites orbiting in geosynchronous orbit 132, international regulatory bodies designate the locations on the geosynchronous orbit where communications satellites can be positioned. These locations are specified in degrees of longitude and are known as orbital slots 118.

In response to the demand for orbital slots 118, the required spacing between geostationary satellites is 2 degrees; however, typical terrestrial, airborne and SAS have NAB widths of typically 5 to 8 degrees. Due to the angle of inclination, such an antenna may illuminate more than one satellite when approaching the Earth's equatorial plane. This may result in illuminating more than one satellite resulting in ASI.

Moreover, small cross section antennas such as an elongated SATCOM antenna panel mounted on an aircraft may have wide antenna beam width and a wide radiation pattern. As exemplified in FIG. 2, a wide radiation pattern 124 (not drawn to scale) may in turn result in illuminating an adjacent satellite 126, a phenomenon referred to herein as ASI. Hence, pointing an antenna correctly becomes more critical for small SAS.

Referring once again to FIGS. 5-6, an electronic steering controller 260 independently optionally controls one or more electromagnetic active regions, for instance 550A, 550B and 550C, on the elongated SATCOM antenna panel 560 and regulates the phase and amplitude of each electromagnetic active region independently. This may improve the discrimination of adjacent satellites by allowing the beams emitted from the electromagnetic active regions to target precisely the satellite leading to the elimination of ASI. The electronic steering may be augmented by mechanical steering to extend the angular range for instance, if the electronic steering operates at in the range of +/−180 degree phase shift then utilized in tandem with the mechanical actuation, a larger angular range may be achieved. As depicted, there are three (3) active regions exemplified, however according to some embodiments of the present invention, there are any number of active regions subject to electronic steering, and each being controlled and activated by the electronic steering controller.

The decision whether to utilize electronic steering is conducted automatically by the electronic steering unit 260. A shifting in electromagnetic signal phase, in conjunction with a decrease or increase in electromagnetic signal amplitude, may result in an improved NAB width allowing better discrimination of satellites.

Figure 7:
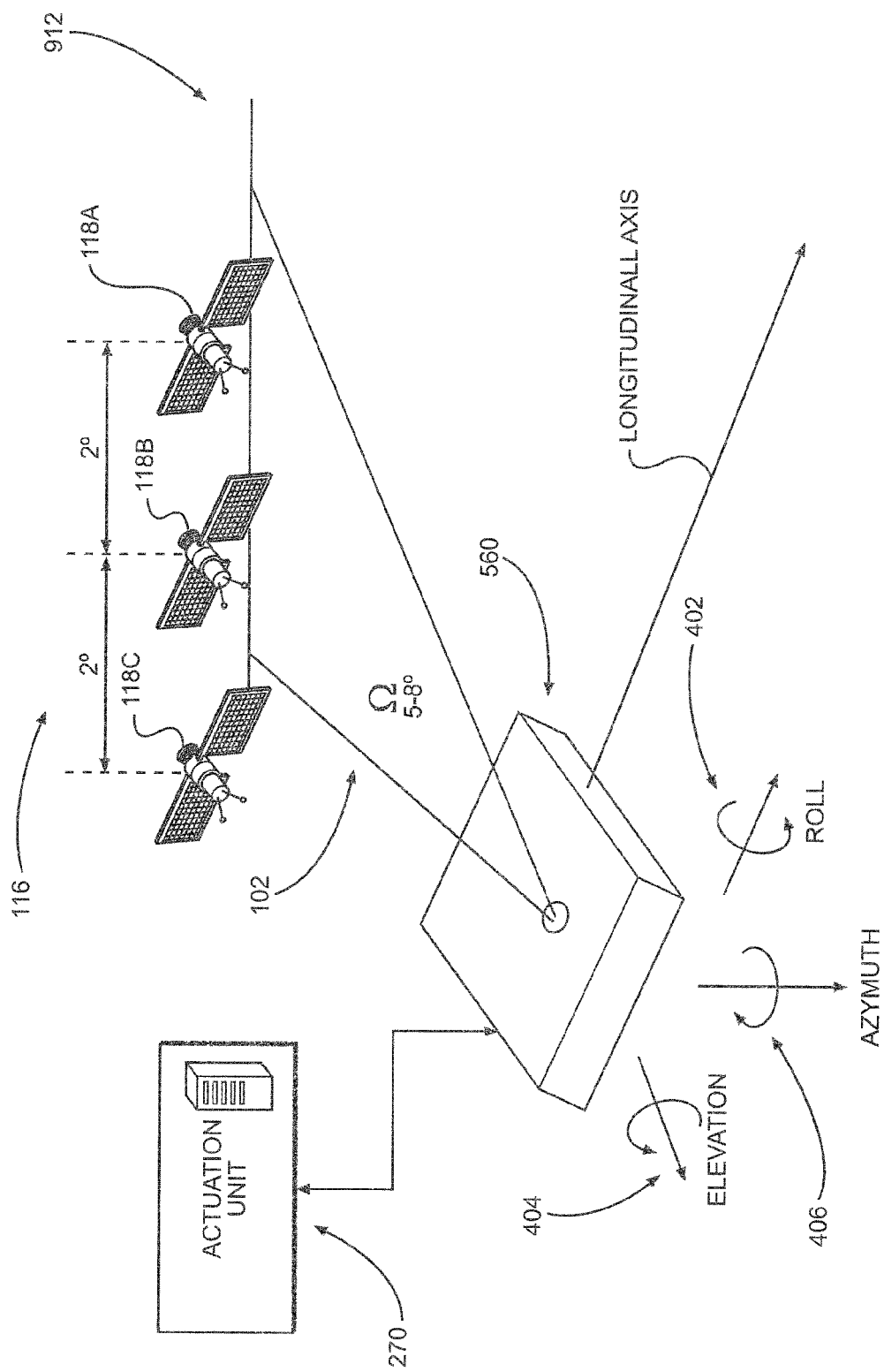
FIG. 7 is an illustration of an exemplary mechanical steering process and axes reversal near or outside the Earth's equatorial plane, according to some embodiments of the present invention.
Figure 8:
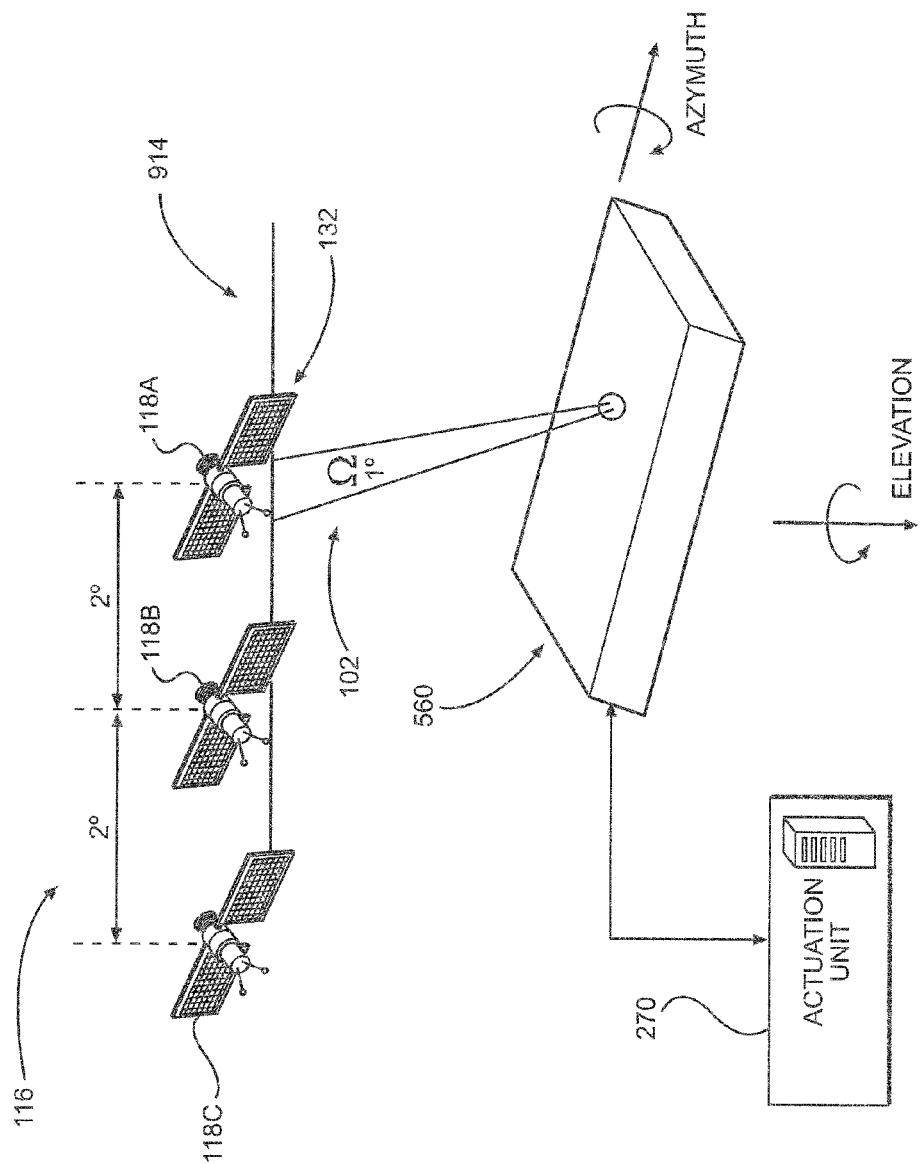
FIG. 8 is also an illustration of an exemplary mechanical steering process and axes reversal near or outside the Earth's equatorial plane, according to some embodiments of the present invention.
Figure 9:
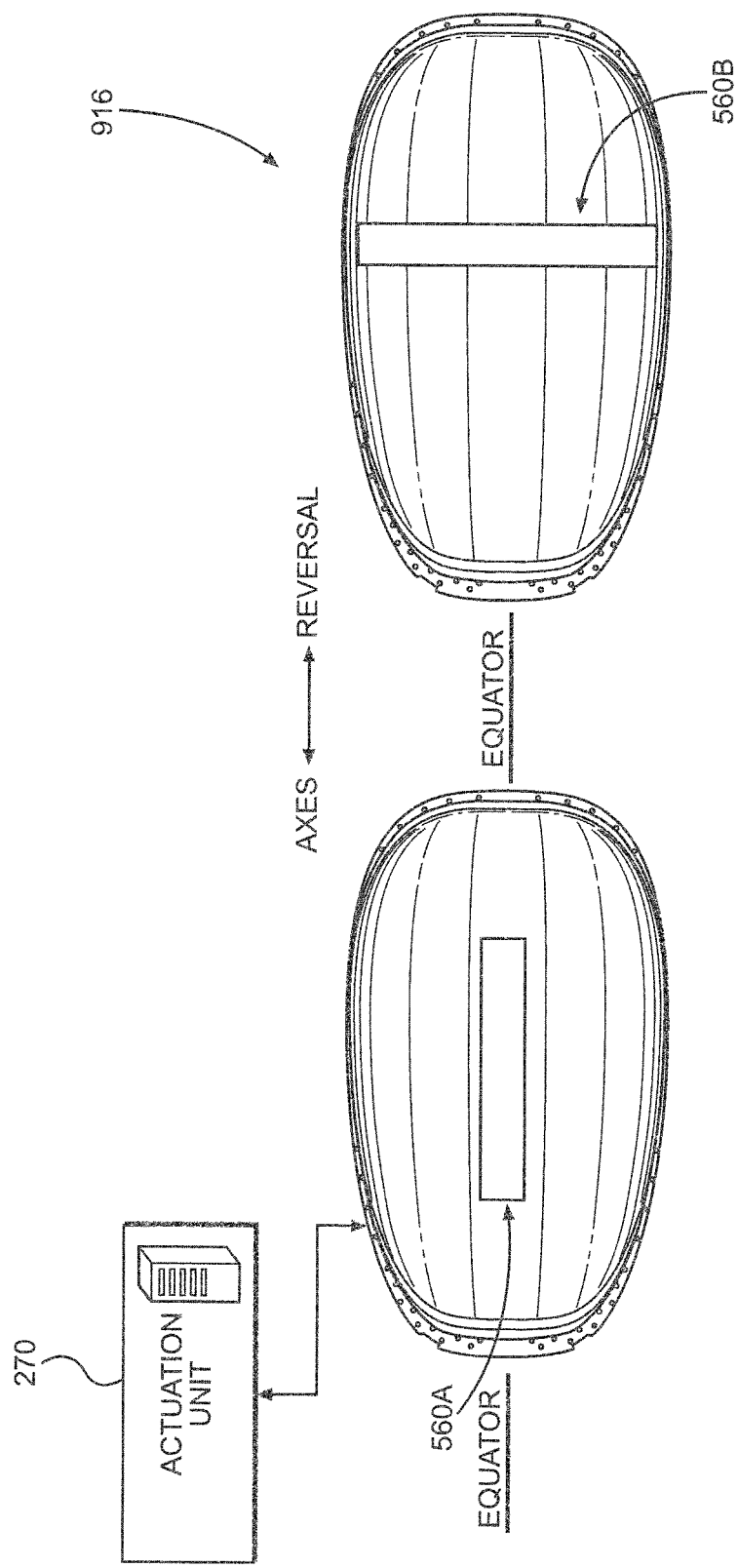
FIG. 9 is an illustration of an exemplary azimuth beam scan over the Earth's equatorial plane, according to some embodiments of the present invention.

Referring next to FIGS. 7-8, which are an illustration of an exemplary mechanical steering and axes reversal operations, 912 and 914, near or outside the Earth's equatorial plane, according to some embodiments of the present invention. Also referred to is FIG. 9, which is a schematic illustration of an azimuth beam scan 916 over the Earth's equatorial plane, according to some embodiments of the present invention.

Dynamically reversing two chosen orthogonal axes, allows mechanical steering that may achieve a NAB width having an angle of typically 1 degree, consequentially illuminating a single satellite. The scenario is exemplified in FIG. 9 in which the elongated SATCOM antenna panel 560A is first inside the Earth's equatorial plane and then the elongated SATCOM antenna panel 560B is outside or near the Earth's equatorial plane and as depicted, is subject to axes reversal.

The elongated SATCOM antenna panel 500 as described hereinafter may be subject to the same mechanical rotation rules defined by the alta-azimuth coordinate system above.

Figure 2:
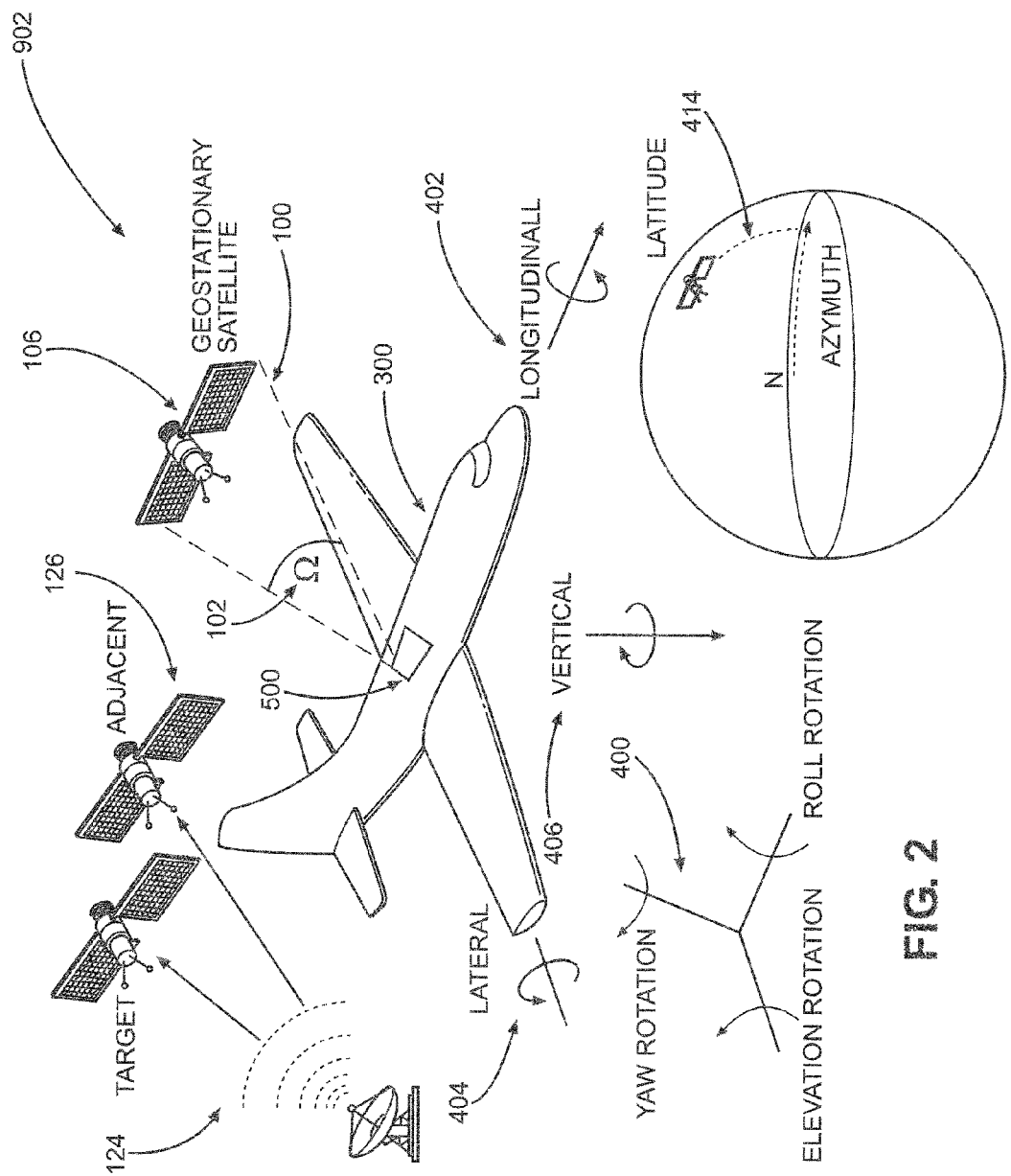
FIG. 2 is an environment illustrating flight dynamics parameters and orthogonal axes of rotation in a three-dimensional space adopting the alta-azimuth coordinate system.

The mechanical steering of the elongated SATCOM antenna panel 560 is based on 3 degrees of freedom around the axes model as exemplified now in FIG. 7 and previously in FIG. 2. This configuration consists of three separate actuators that work independently. FIGS. 7-8 depict a simplified view of the actuators in the form of mechanical gears and the actuation mechanism.

One or more actuation units 270 may control the actuators, the actuation process, the axes reversal process, the power supplied to each servo and the coordination between each actuator.

In use, the actuation mechanism (not depicted) is instructed by the actuation unit 270 to rotate the elongated SATCOM antenna panel around the roll axis so it is maintained aligned with the Earth's equatorial plane and the NAB width created eliminates ASI.

Typical airborne and SAS such as the one depicted in FIG. 5 have a NAB width with an angle of typically 5 to 8 degrees 102 (represented by the Greek letter $\Omega$). Under normal conditions, such an antenna may illuminate only one satellite.

However, when such an elongated SATCOM antenna panel approaches the Earth's equatorial plane, due to the angle of inclination and limits inherent in rotations around the longitudinal axis 402, lateral axis 404 and the vertical axis 406, the antenna may illuminate more than one satellite. For instance, satellites such as 118A and 118B which are equally spaced across the Earth's equatorial plane 132. This phenomenon may result in ASI.

Optionally, optimizations are utilized to overcome the above mentioned illumination phenomenon. The optimizations are described as follows:

(a) The actuators are instructed by the actuation unit 270 to rotate the elongated SATCOM antenna panel around the roll axis so it is maintained aligned with the Earth's equatorial plane and the NAB width created eliminates ASI. As described, the present invention allows a third axis of rotation-rotating the SAS around the roll axis.

(b) The actuation unit 270 that operates the actuation mechanism controls the axes reversal mechanism (not depicted) that reverses the roles of two selected orthogonal axes, for instance the elevation and azimuth axes.

The reversing operation allows the elongated SATCOM antenna panel electromagnetic active regions to be aligned along the radome and perpendicular to the Earth's equatorial plane line on routes external to the Earth's equatorial plane without adversely affecting the beam width resolution. The ability to dynamically reverse two chosen axes, allows achieving an optimized NAB optionally having a width with an angle of typically 1 degrees 102 (represented by the Greek letter $\Omega$), as depicted, resulting in the illumination of only one satellite 118A.

Figure 10A:
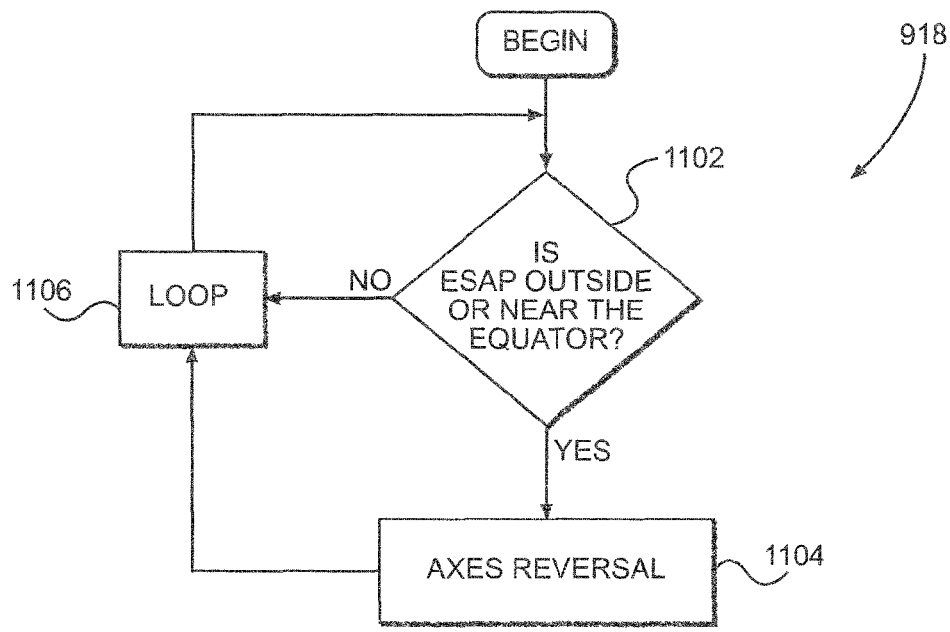
FIGS. 10A-10B are flowcharts illustrating a method for reversing two chosen orthogonal axes, according to some embodiments of the present invention.
Figure 10B:
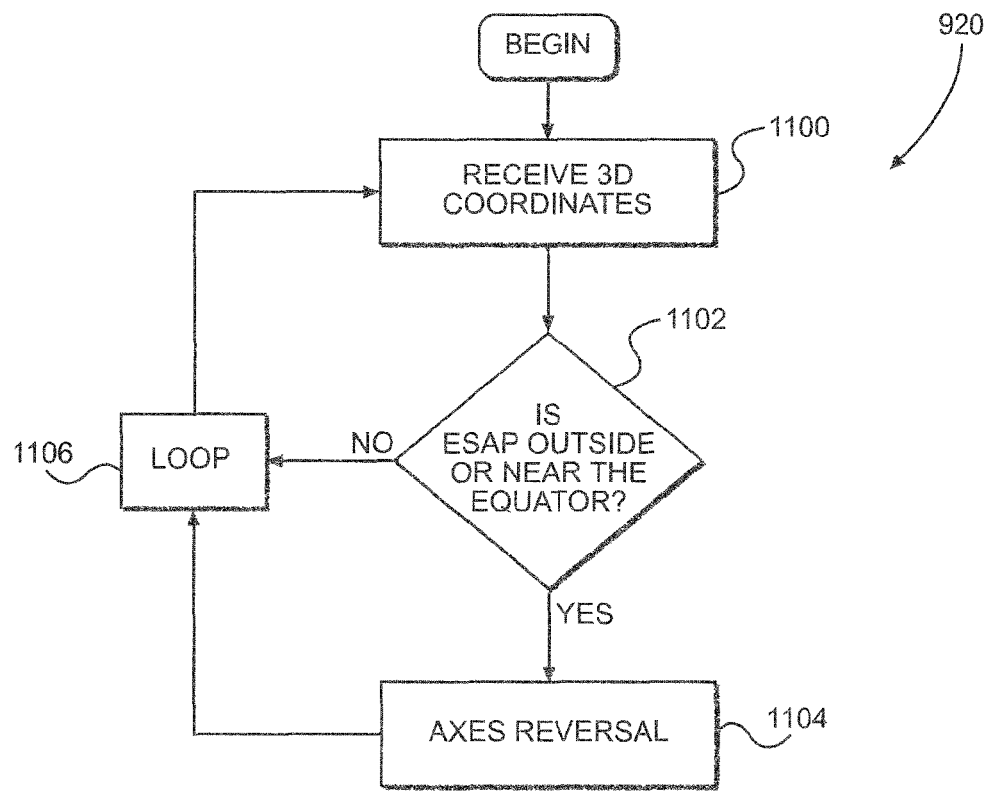

Referring next to FIGS. 10A-10B, which are flowcharts, 918 and 920, illustrating a method for reversing two chosen orthogonal axes, according to some embodiments of the present invention.

Axes reversal is an optimization that allows the elongated SATCOM antenna panel 560 to be aligned along the radome and perpendicular to the Equator even on routes external or near the Equator, thereby reducing degradation of the narrow azimuth beam optionally having a typical width of no more than a 2-degree angle.

Referring first to FIG. 10A, the method involves first at 1102 receiving status information indicative of whether the elongated SATCOM antenna panel 560 is outside or near the Earth's equatorial plane.

The three-dimensional coordinates may be obtained for instance using a plurality of gyroscopes and/or optic sensors and/or magnetometers and/or other type of sensors able to gather information about the vehicle's orientation in three-dimensional space known in the art.

Next, in case the information is indeed indicative that the elongated SATCOM antenna panel 560 is outside or near the Earth's equatorial plane, the method involves at 1104 transmitting instructions for reversing first axis and second orthogonal axis of rotation, for instance the azimuth and elevation.

Otherwise, in case the information is not indicative that the elongated SATCOM antenna panel 560 is outside or near the Earth's equatorial plane, the method involves at 1106 looping back to 1100.

Referring now to FIG. 10B, the method optionally involves first at 1100, receiving the three-dimensional coordinates of the elongated SATCOM antenna panel. The three-dimensional coordinates may be obtained for instance using a plurality of gyroscopes and/or optic sensors and/or magnetometers and/or other types of sensors known in the art that are able to gather information about the vehicle's orientation in three-dimensional space.

Figure 11:
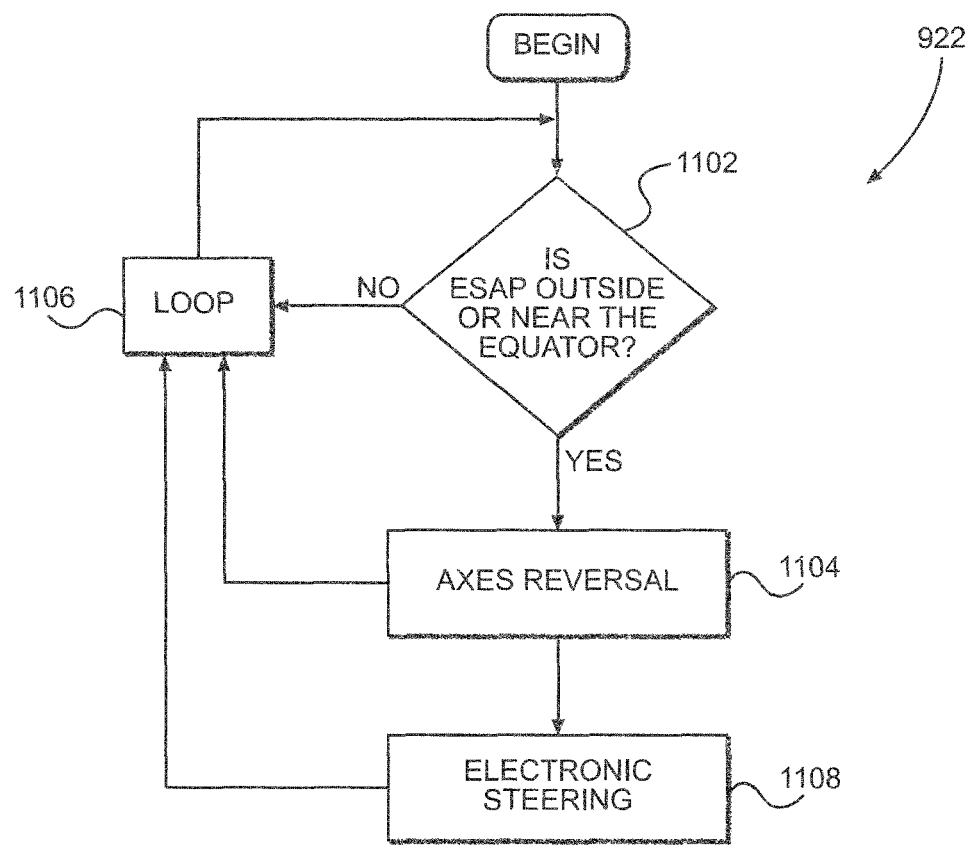
FIG. 11 is a flowchart illustrating a method for reversing two chosen orthogonal axes in conjunction with electronic steering, according to some embodiments of the present invention.

More optionally, and referring now to FIG. 11, the flowchart, 922, illustrated at 1108 the method involves transmitting instructions for steering the electromagnetic signal phase and electromagnetic signal amplitude of electromagnetic active regions on the elongated SATCOM antenna panel 560.

EXAMPLES

Reference is now made to the following examples, which together with the above descriptions and drawing figures; illustrate the embodiments of the invention in a non limiting fashion.

It should be understood that all examples provided hereinabove are exemplary in nature. For example, there may be other methods of receiving a measurement representative of the orientation of the carrying vehicle without departing from the scope of the claims.

Example 1

Aircraft Single Axes Adjustment

In some embodiments of the present invention, it is desired to eliminate the outcome of a rotation, such as a rotation around the roll axis, commanded on a carrying aircraft by a human pilot. The desired response is to cause the elongated SATCOM antenna panel to remain aimed at a single geostationary satellite eliminating ASI.

Any rotation around the roll axis of the aircraft will neither degrade the signal transmitted to the geostationary satellite nor shall it cause communications disconnections, due to the adjustments in the form of rotations imparted on the correct axes by the actuation unit. Therefore, the outcome, in this exemplary case is that the actuation unit adjusts rotation of the elongated SATCOM antenna panel, by offsetting the corresponding value of rotation the aircraft experiences.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant elongated SATCOM antenna panel will be developed and the scope of the term elongated SATCOM antenna panel is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for communication with a geostationary satellite, for reversing a first axis of rotation with a second orthogonal axis of rotation, comprising:
    an elongated satellite communications (SATCOM) antenna panel sized and shaped to radiate a narrow azimuth beam (NAB) having a typical width of no more than a 2-degree angle;
    an actuation unit that rotates said elongated SATCOM antenna panel about the first axis of rotation, the first axis being a longitudinal axis parallel to said elongated SATCOM antenna panel to impart an elevation rotation; and
    a control unit that selectively transmits instructions to said actuation unit for reversing roles of the first axis of rotation with the second orthogonal axis of rotation based on whether a location of said elongated SATCOM antenna panel is within a predetermined range of latitude of the Earth's equatorial plane.

2. The system of claim 1, wherein said actuation unit independently controls a plurality of orthogonal actuators in which each of said plurality of orthogonal actuators independently tilts said elongated SATCOM antenna panel about at least one of said longitudinal axis and one or both of the axes of rotation perpendicular to said longitudinal axis.

3. The system of claim 1, wherein the system is located on a moving vehicle.

4. The system of claim 1, wherein said NAB having a typical width of no more than a 2-degree angle is generated as a conical beam emitted to intersect two points on a geostationary orbit such that said NAB having a typical width of no more than a 2-degree angle formed between origins of projections along said conical beam, targets only one satellite.

5. The system of claim 1, wherein said elongated SATCOM antenna panel comprises a plurality of electromagnetic active regions in which each independently receives and emits an electromagnetic signal phase and electromagnetic signal amplitude.

6. The system of claim 1, wherein said elongated SATCOM antenna panel receives and transmits multiple electromagnetic signals in frequency bands of interest.

7. The system of claim 1, wherein said actuation unit receives three dimensional (3D) coordinates of a carrying vehicle; and
wherein upon approaching Earth's equatorial plane, said elongated SATCOM antenna panel is maintained aligned with said Earth's equatorial plane by said actuation unit and parallel to a motion trajectory of said carrying vehicle, maintaining said elongated SATCOM antenna panel aligned with Earth's equatorial plane and in parallel to a motion trajectory of said carrying vehicle.

8. The system of claim 2, wherein certain ones of said plurality of orthogonal actuators comprise:
a motor, generating rotational forces and moments about center of gravity of a carrying vehicle, wherein each certain one of said plurality of orthogonal actuators autonomously exerts forces in three dimensional space.

9. The system of claim 2, wherein said actuation unit regulates timing, power, torque and direction of a certain one of said plurality of orthogonal actuators.

10. The system of claim 3, wherein said reversing operates said elongated SATCOM antenna panel to be aligned along a radome and perpendicular to Earth's equatorial plane on routes external to the predetermined range of latitude of said Earth's equatorial plane reducing degradation of said NAB having a typical width of no more than a 2-degree angle.

11. The system of claim 5, wherein an electronic steering controller independently regulates said electromagnetic signal phase and said electromagnetic signal amplitude of certain of a plurality of said electromagnetic active regions.

12. The system of claim 6, wherein said multiple electromagnetic signals in frequency bands of interest are Ku-band signals.

13. The system of claim 6, wherein said multiple electromagnetic signals in frequency bands of interest are at least one of an L band (1 GHz to 2 GHz), an S band (2 GHz to 3 GHz), a C band (4 GHz to 7 GHz), an X band (8 GHz to 11 GHz) and a Ka band (17 GHz to 21 GHz and 27 GHz to 31 GHz).

14. The system of claim 3, wherein said actuation unit imparts reversing of said first axis of rotation with said second axis of rotation when the vehicle is within a range of latitude extending from 15 degrees south latitude to 15 degrees north latitude.

15. A computer-implemented method for reversing a first axis of rotation with a second orthogonal axis of rotation, the first axis being a longitudinal axis parallel to an elongated SATCOM antenna panel, comprising:

receiving using a processor status information indicative of whether the elongated SATCOM antenna panel is outside a predetermined range of latitude of Earth's equatorial plane;
transmitting instructions for reversing said first axis and said second orthogonal axis; and
wherein said transmitting instructions for reversing roles of the first axis of rotation with the second orthogonal axis of rotation is performed based on whether a location of said elongated SATCOM antenna panel is within the predetermined range of latitude of the Earth's equatorial plane.

16. The method of claim 15, further comprising:
receiving three dimensional coordinates of a carrying vehicle.

17. The method of claim 15, further comprising:
transmitting instructions for steering the electromagnetic signal phase and electromagnetic signal amplitude of electromagnetic active regions on said elongated SATCOM antenna panel.

18. A computer-implemented method for using an elongated SATCOM antenna panel illuminating a single satellite from an array of satellites on a geosynchronous orbit about the Earth, comprising:
locating said satellite, using a processor;
receiving coordinates of a carrying vehicle;
maintaining an elongated SATCOM antenna panel aligned with Earth's equatorial plane and in parallel to a motion trajectory of said carrying vehicle by transmitting instructions for reversing roles of a first axis of rotation with a second orthogonal axis of rotation based on whether a location of said elongated SATCOM antenna panel is within a predetermined range of latitude of the Earth's equatorial plane, the first axis being a longitudinal axis parallel to said elongated SATCOM antenna panel; and
using said elongated SATCOM panel to radiate a narrow azimuth beam (NAB) having a typical width of no more than a 2-degree angle thereby to illuminate a single satellite from an array of satellites in said geosynchronous orbit about the Earth.

19. The method of claim 18 further comprising transmitting instructions for steering the electromagnetic signal phase and electromagnetic signal amplitude of electromagnetic active regions on said elongated SATCOM antenna panel.

20. The method of claim 18 wherein said locating comprises:
tracking a tracking signal transmitted from said single satellite;
wherein said tracking signal transmitted from a transmitter aboard said single satellite is indicative of a position of said single satellite; and
wherein said array of satellites orbiting in said geosynchronous orbit about the earth such that said elongated SATCOM antenna panel is adapted to track said single satellite within predetermined geosynchronous satellite parking slots having a separation of at least a 2-degree angle.

* * * * *